United States Patent
Gao et al.

(10) Patent No.: US 11,363,482 B2
(45) Date of Patent: Jun. 14, 2022

(54) METHODS AND APPARATUSES FOR CHANNEL STATE INFORMATION TRANSMISSION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

(*) Notice: Subject to any disclaimer, the term of this patent is extended or adjusted under 35 U.S.C. 154(b) by 35 days.

(21) Appl. No.: 16/959,830

(22) PCT Filed: Jan. 4, 2018

(86) PCT No.: PCT/CN2018/071391
§ 371 (c)(1),
(2) Date: Jul. 2, 2020

(87) PCT Pub. No.: WO2019/134099
PCT Pub. Date: Jul. 11, 2019

(65) Prior Publication Data
US 2020/0374730 A1 Nov. 26, 2020

(51) Int. Cl.
*H04W 24/10* (2009.01)
*H04W 72/04* (2009.01)
*H04L 5/00* (2006.01)

(52) U.S. Cl.
CPC ........... *H04W 24/10* (2013.01); *H04L 5/0053* (2013.01); *H04W 72/042* (2013.01)

(58) Field of Classification Search
CPC .... H04W 24/10; H04W 72/042; H04L 5/0053
See application file for complete search history.

(56) References Cited

U.S. PATENT DOCUMENTS

| | | |
|---|---|---|
| 2017/0208568 A1 | 7/2017 | Nam et al. |
| 2017/0366377 A1 | 12/2017 | Papasakellariou |
| 2019/0319758 A1 | 10/2019 | Yum et al. |
| 2020/0099435 A1 | 3/2020 | Kang et al. |

FOREIGN PATENT DOCUMENTS

| | | |
|---|---|---|
| CN | 103391174 A | 11/2013 |
| CN | 105144614 A | 12/2015 |
| EP | 3582538 A1 | 12/2019 |

(Continued)

OTHER PUBLICATIONS

Huawei et al. "UE-specific DCI contents in NR", 3GPP TSG RAN WG1 Meeting #90, R1-1714327, Aug. 21-25, 2017, (7 pages total).

(Continued)

*Primary Examiner* — Ronald B Abelson
(74) *Attorney, Agent, or Firm* — Sughrue Mion, PLLC

(57) ABSTRACT

Embodiments of the present disclosure relate to methods and apparatuses for Control State Information (CSI) transmission. In example embodiments, a method implemented in a terminal device is provided. According to the method, in response to receiving DCI from a network device, a configuration for transmitting CSI to the network device is determined at least based on the DCI. The DCI indicates a CSI-RS for determining the CSI and timing information associated with the CSI. The CSI is determined by measuring the CSI-RS in response to receiving the CSI-RS from the network device. The CSI is transmitted to the network device based on the configuration.

22 Claims, 5 Drawing Sheets

(56) References Cited

FOREIGN PATENT DOCUMENTS

| EP | 3614719 A1 | 2/2020 |
|---|---|---|
| WO | 2018231812 A1 | 12/2018 |

OTHER PUBLICATIONS

"WF on CSI timing offset for PUSCH" LG Electronics, Ericsson, InterDigital, Samsung, [ZTE, Sanechips], 3GPP TSG RAN WG1 Meeting #91, R1-1721527, Nov. 27-Dec. 1, 2017, pp. 1-5 ( 5 pages total).
Communication dated Mar. 25, 2021, from the European Patent Office in application No. 18898416.5.
"3rd Generation Partnership Project; Technical Specification Group Radio Access Network; NR; Physical layer procedures for data (Release 15)"; 3GPP TS 38.214, V15.0.0, Technical Specification, Dec. 2017, pp. 1-71.
Qualcomm Incorporated, "Remaining Details on CSI Framework", 3GPP TSG RAN WG1 Meeting #91, R1-1720665, Nov. 27-Dec. 1, 2017, pp. 1-5.
Qualcomm Incorporated, "DL/UL Scheduling, Processing Time and HARQ management", 3GPP TSG-RAN WG1 Meeting #91, R1-1720688, Nov. 27-Dec. 1, 2017, pp. 1-11.
Qualcomm Incorporated, "Remaining Issues on Non-Codebook Based UL Transmission", 3GPP TSG RAN WG1 Meeting #91, R1-1720658, Nov. 27-Dec. 1, 2017, pp. 1-4.
LG Electronics et al., "WF on CSI timing offset for PUSCH", 3GPP TSG RAN WG1 Meeting #91, R1-1721677, Nov. 27-Dec. 1, 2017, pp. 1-5.
LG Electronics, "Discussions on CSI reporting", 3GPP TSG RAN WG1 Meeting #91, R1-1719906, Nov. 27-Dec. 1, 2017, pp. 1-8.
LG Electronics, "Discussion on CSI framework", 3GPP TSG RAN WG1 NR Ad-Hoc#2, R1-1710284, Jun. 27-30, 2017, pp. 1-7.
Huawei et al., "Signaling design for CSI reporting", 3GPP TSG RAN WG1 Meeting #91, R1-1719427, Nov. 27-Dec. 1, 2017, pp. 1-8.
International Search Report for PCT/CN2018/071391 dated Jun. 27, 2018 (PCT/ISA/210).
Written Opinion for PCT/CN2018/071391 dated Jun. 27, 2018 (PCT/ISA/237).
Office Action dated Aug. 31, 2021 in Japanese Application No. 2020-537165.
3GPP TR 38.802 V1.2.0; 3rd Generation Partnership Project; Technical Specification Group Radio Access Network; Study on New Radio (NR) Access Technology; Physical Layer Aspects (Release 14), Feb. 2017 (83 pages total).
ZTE, "On CSI framework details", 3GPP TSG RAN WG1 NR AdHoc#2, R1-1711607, Qingdao, China, Jun. 27-30, 2017 (14 pages total).

METHODS AND APPARATUSES FOR CHANNEL STATE INFORMATION TRANSMISSION

CROSS REFERENCE TO RELATED APPLICATIONS

This application is a National Stage of International Application No. PCT/CN2018/071391 filed Jan. 4, 2018, the disclosure of which is incorporated herein in its entirety by reference.

TECHNICAL FIELD

Embodiments of the present disclosure generally relate to the field of telecommunication, and in particular, to methods and apparatuses for Channel State Information (CSI) transmission.

BACKGROUND

With the development of communication technologies, multiple types of services or traffic have been proposed, for example, enhanced mobile broadband (eMBB) generally requiring high data rate, massive machine type communication (mMTC) typically requiring long battery lifetime, and ultra-reliable and low latency communication (URLLC). Meanwhile, multi-antenna schemes, such as beam management, reference signal (RS) transmission, and so on, are studied for new radio access (NR). Particularly, configurable CSI reporting has been discussed based on the new designed RS and frame structure.

Generally speaking, in order to obtain CSI of a downlink channel between a network device and a terminal device, the network device may transmit a Channel State Information-Reference Signal (CSI-RS) to the terminal device. The terminal device may receive the CSI-RS from the network device, and obtain the CSI by measuring the CSI-RS. The terminal device may report the CSI to the network device. The process for reporting the CSI is also called as "CSI feedback".

In NR, different time offsets associated with CSI feedback have been designed and agreed in 3GPP specification works. However, the detailed solution for CSI reporting based on these different offsets has not been provided yet.

SUMMARY

In general, example embodiments of the present disclosure provide methods and apparatuses for CSI transmission.

In a first aspect, there is provided a method implemented in a terminal device. According to the method, in response to receiving DCI from a network device, a configuration for transmitting CSI to the network device is determined at least based on the DCI. The DCI indicates a CSI-RS for determining the CSI and timing information associated with the CSI. The CSI is determined by measuring the CSI-RS in response to receiving the CSI-RS from the network device. The CSI is transmitted to the network device based on the configuration.

In a second aspect, there is provided a method implemented in a network device. According to the method, DCI is transmitted to a terminal device. The DCI indicates a CSI-RS for determining the CSI by the terminal device and timing information associated with the CSI. A configuration for receiving the CSI from the terminal device is determined at least based on the DCI. The CSI is received from the terminal device based on the configuration.

In a third aspect, there is provided a terminal device. The terminal device comprises a processor and a memory coupled to the processor. The memory stores instructions that when executed by the processor, cause the terminal device to perform actions. The actions comprise: in response to receiving Downlink Control Information (DCI) from a network device, determining, at least based on the DCI, a configuration for transmitting Channel State Information (CSI) to the network device, the DCI indicating a Channel State Information-Reference Signal (CSI-RS) for determining the CSI and timing information associated with the CSI; in response to receiving the CSI-RS from the network device, determining the CSI by measuring the CSI-RS; and transmitting, based on the configuration, the CSI to the network device.

In a fourth aspect, there is provided a network device. The terminal device comprises a processor and a memory coupled to the processor. The memory stores instructions that when executed by the processor, cause the network device to perform actions. The actions comprise: transmitting Downlink Control Information (DCI) to a terminal device, the DCI indicating a Channel State Information-Reference Signal (CSI-RS) for determining the Channel State Information (CSI) by the terminal device and timing information associated with the CSI; determining, at least based on the DCI, a configuration for receiving the CSI from the terminal device; and receiving, based on the configuration, the CSI from the terminal device.

In a fifth aspect, there is provided a computer readable medium having instructions stored thereon. The instructions, when executed on at least one processor, cause the at least one processor to carry out the method according to the first aspect of the present disclosure.

In a sixth aspect, there is provided a computer readable medium having instructions stored thereon. The instructions, when executed on at least one processor, cause the at least one processor to carry out the method according to the second aspect of the present disclosure.

In a seventh aspect, there is provided a computer program product that is tangibly stored on a computer readable storage medium. The computer program product includes instructions which, when executed on at least one processor, cause the at least one processor to carry out the method according to the first aspect or the second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
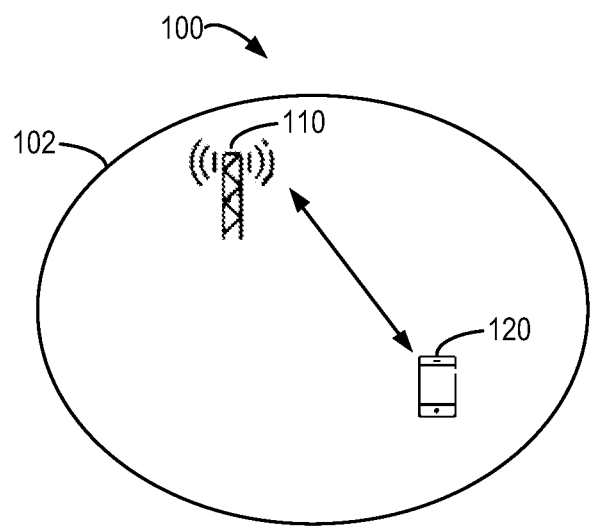
FIG. 1 is a block diagram of a communication environment 100 in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as examples of the terminal device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Communication discussed in the present disclosure may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

FIG. 1 shows an example communication network 100 in which implementations of the present disclosure can be implemented. The network 100 includes a network device 110 and a terminal device 120 served by the network device 110. The serving area of the network device 110 is called as a cell 102. It is to be understood that the number of network devices and terminal devices is only for the purpose of illustration without suggesting any limitations. The network 100 may include any suitable number of network devices and terminal devices adapted for implementing implementations of the present disclosure. Although not shown, it is to be understood that one or more terminal devices may be located in the cell 102 and served by the network device 110.

In the communication network 100, the network device 110 can communicate data and control information to the terminal device 120 and the terminal device 120 can also communication data and control information to the network device 110. A link from the network device 110 to the terminal device 120 is referred to as a downlink (DL), while a link from the terminal device 120 to the network device 110 is referred to as an uplink (UL).

The communications in the network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In order to obtain CSI of a communication channel between the network device 110 and the terminal device 120, the network device 110 may transmit a channel state information-reference signal (CSI-RS) to the terminal device 120. The terminal device 120 may receive the CSI-RS from the network device 110, and obtain channel information by measuring the CSI-RS. The terminal device 120 may then determine the CSI of the communication channel based on the obtained channel information and a corresponding codebook. For example, the obtained channel information can be quantized into the CSI based on the corresponding codebook. The terminal device 120 may report the CSI to the network device 110. The process for reporting the CSI is also called as "CSI feedback".

The CSI reporting by the terminal device may include periodic CSI (P-CSI) reporting, semi-persistent CSI (SP-CSI) reporting and aperiodic CSI (A-CSI) reporting. The P-CSI reporting refers to that the terminal device periodically feeds back CSI to the network device based on a configuration of the network device to the terminal device.

The P-CSI can be determined based on periodically transmitted CSI-RSs (also referred to as periodic CSI-RSs (P-CSI-RSs)). The SP-CSI reporting is similar to the P-CSI reporting, except that the SP-CSI reporting can be activated by a signal and deactivated by another signal. When the SP-CSI reporting is activated, the terminal device will periodically feeds back CSI to the network device. The SP-CSI can be determined based on semi-persistent CSI-RSs (SP-CSI-RSs), which are similar to or based on P-CSI-RSs. The A-CSI reporting refers to that the network device triggers, via trigger signaling (such as, DCI), the CSI feedback from the terminal device to the network device. The A-CSI can be determined based on a P-CSI-RS, a SP-CSI-RS or an periodic CSI-RS (A-CSI-RS), which may be indicated by the trigger signaling (that is, DCI). For the purpose of discussion, in the following, some embodiments will be described with reference to "A-CSI reporting".

In NR, different time offsets associated with A-CSI reporting have been designed and agreed in 3GPP specification works. For example, it has been agreed that if UL assignment (for example, Physical Downlink Control Channel (PDCCH) carrying DCI) is transmitted in slot N, the A-CSI-RS will be transmitted in slot N+X. For the A-CSI-RS triggering offset X, X may be fixed to zero or configurable on a per resource set basis. The offset X may be measured in slots. In the following discussions, the offset X may also be referred to as a "first time offset" or "first offset". Another time offset Y for A-CSI reporting has also been agreed in 3GPP specification works. The time offset Y can be indicated by the trigger signaling. That is, DCI to be used for indicating the timing for PUSCH can be used to indicate the time offset Y. Specifically, a set of values for the time offset Y can be preconfigured via higher layer signaling. Then, one of the set of values can be selected according to different conditions, and the selected value of the time offset Y can be indicated by the DCI. In the following discussions, the offset Y may also be referred to as a "second time offset" or "second offset". For slot-based scheduling, it has also been agreed that if UL assignment (for example, PDCCH which carries DCI indicating the timing for PUSCH) is transmitted in slot N, the PUSCH will be transmitted in slot N+K2. In the following discussions, the offset K2 may also be referred to as a "third time offset" or "third offset".

In NR, the staring position of the time offset Y has not been specified in 3GPP specification works. Moreover, the detailed solution for CSI reporting based on these different offsets has not been provided yet. In this event, a solution for CSI transmission is proposed, which can solve the problems above and one or more of other potential problems.

Principle and implementations of the present disclosure will be described in detail below with reference to FIG. 2, which shows a process 200 for CSI transmission according to an implementation of the present disclosure. For the purpose of discussion, the process 200 will be described with reference to FIG. 1. The process 200 may involve the network device 110 and the terminal device 120 in FIG. 1.

Figure 2:
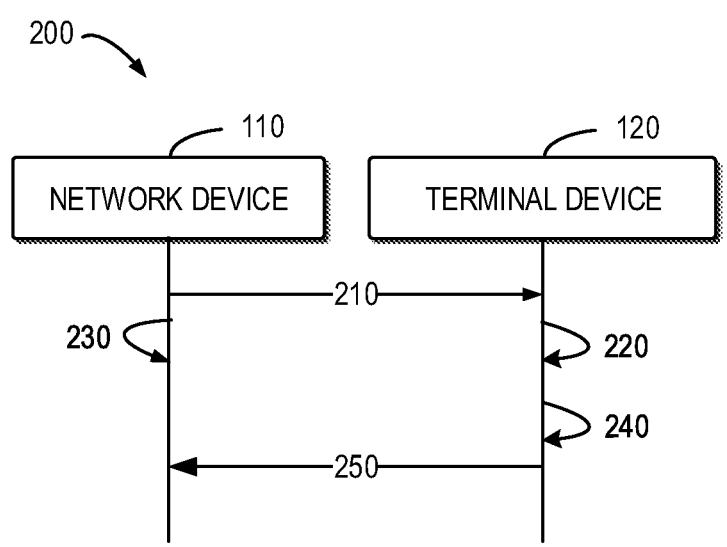
FIG. 2 illustrates a process for CSI transmission according to some embodiments of the present disclosure.

As shown in FIG. 2, in some embodiments, the network device 110 transmits (210) DCI to the terminal device 110.

In some embodiments, the DCI may indicate a CSI-RS for determining the CSI to the terminal device 120. For example, the DCI may indicate that the A-CSI can be determined based on P-CSI-RS, SP-CSI-RS or A-CSI-RS. In some embodiments, the DCI may also indicate timing information associated with the CSI. For example, the timing information may include at least one of the following: a first time offset (that is, the offset X) for transmitting an aperiodic CSI-RS by the network device 110; a second time offset (that is, the offset Y) for transmitting the CSI by the terminal device 120; and a third time offset (that is, the offset K2) for PUSCH transmission. For a specific time offset (such as, any of the offsets X, Y and K2), a set of values for the specific time offset can be preconfigured to the terminal device 120 via higher layer signaling. One of the set of values can be selected according to different conditions, and the selected value of the specific time offset can be indicated by the DCI.

In some embodiments, in response to receiving the DCI from the network device 110, the terminal device 120 determines (220), at least based on the DCI, a configuration for transmitting the CSI to the network device 110. Likewise, the network device 110 may determine (230), at least based on the DCI, a configuration for receiving the CSI from the terminal device 120 in a similar way to the terminal device 120.

Only for the sake of simplification, in the following descriptions, the determination of the configuration for CSI transmission is described from the perspective of the terminal device 120. However, it is to be understood that this is only for the purpose of illustration without suggesting any limitations to the present disclosure. It is to be understood that, the network device 110 can determine the configuration for receiving the CSI in a similar way to the terminal device 120.

In some embodiments, the terminal device 120 may determine a channel for transmitting the CSI to the network device 110. For example, the channel for transmitting the A-CSI can be PUSCH or PUCCH. Alternatively, or in addition, in some embodiments, the terminal device 120 may determine a position for transmitting the CSI in time domain based on at least one of the time offsets X, Y and K2.

In some embodiments, the DCI may indicate a value of the time offset Y. The terminal device 120 may determine a starting position for the time offset Y and then determine the position for transmitting the CSI in time domain based on the starting position for the time offset Y and the value of the time offset Y.

In some embodiments, the starting position for the time offset Y may be different for different cases. Specifically, the time offset Y can be measured in slots or symbols.

Figure 3A:
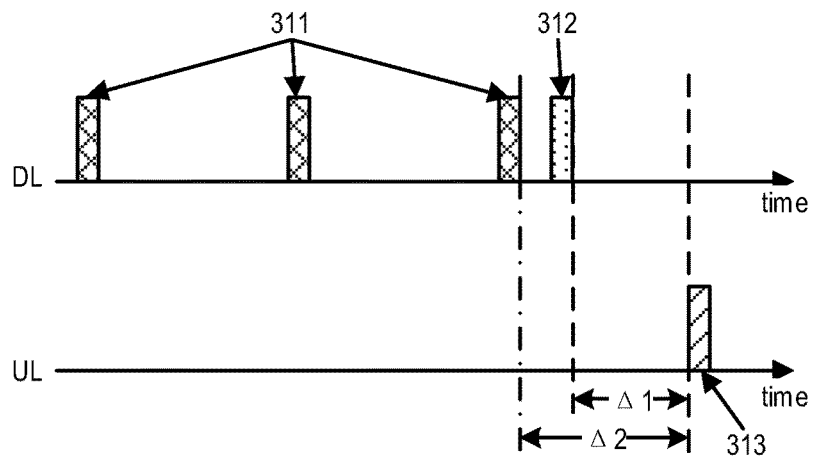
FIGS. 3A-3C illustrate examples according to some embodiments of the present disclosure.
Figure 3B:
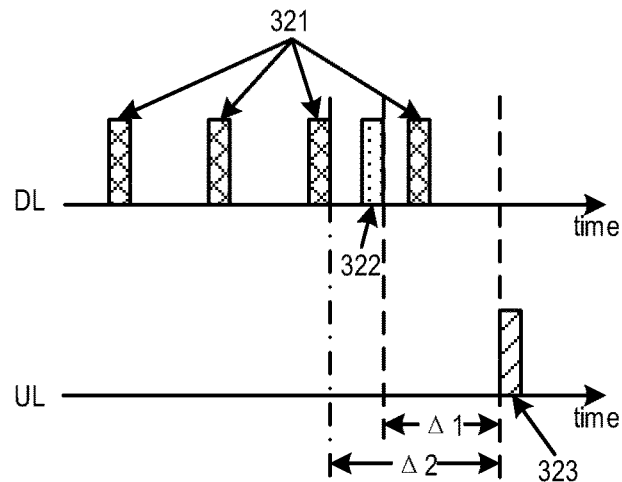

In one embodiment, for example, if the DCI indicates that the A-CSI is to be determined based on a P-CSI-RS or SP-CSI-RS, the starting position for the time offset Y may be determined to be the end of PDCCH carrying the DCI. In one embodiment, the starting position for the time offset Y may be determined to be the last symbol of PDCCH carrying the DCI. Suppose that the A-CSI is to be transmitted on PUSCH, in this event, the time offset Y may represent the number of symbols between the last symbol for PDCCH carrying the DCI and the first symbol for PUSCH carrying the A-CSI. In another embodiment, the starting position for the time offset Y may be determined to be the end of the slot with PDCCH carrying the DCI. Suppose that the A-CSI is to be transmitted on PUSCH, in this event, the time offset Y may represent the number of slots between the end of the slot with PDCCH carrying the DCI and the start of slot with PUSCH carrying the A-CSI. For example, the end of the slot with PDCCH carrying the DCI may be determined based on at least one of the numerology of PDCCH and the numerology of PUSCH. For example, the number of slots Y may be determined based on the numerology of PUSCH. For example, the start of the slot with PUSCH may be determined with at least one of the numerology of PDCCH and the numerology of PUSCH. FIGS. 3A and 3B show examples of such embodiments.

In some embodiments, as shown in FIG. 3A, A-CSI 313 may be determined based on a P-CSI-RS or SP-CSI-RS 311 transmitted prior to the transmission of DCI 312. In this event, the starting position for the time offset Y may be determined to be the last symbol of PDCCH carrying the DCI 312. As shown in FIG. 3A, the time offset Y may represent the number of symbols between the last symbol for PDCCH carrying the DCI 312 and the first symbol for PUSCH carrying the A-CSI 313. That is, Y=Δ1.

In some embodiments, as shown in FIG. 3B, A-CSI 323 may be determined based on a P-CSI-RS or SP-CSI-RS 321 transmitted prior to or subsequent to the transmission of DCI 322. In this event, the starting position for the time offset Y may be determined to be the last symbol of PDCCH carrying the DCI 322. As shown in FIG. 3B, the time offset Y may represent the number of symbols between the last symbol for PDCCH carrying the DCI 322 and the first symbol for PUSCH carrying the A-CSI 323. That is, Y=Δ1.

Figure 3C:
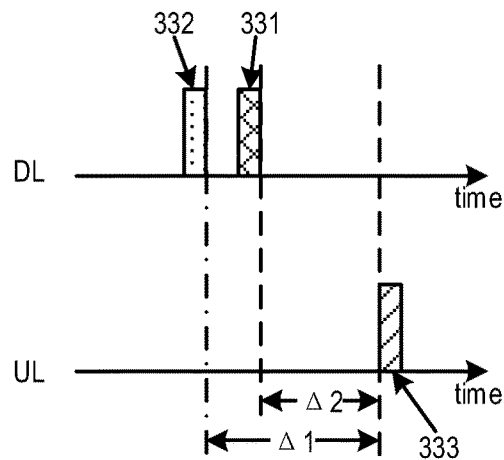

In another embodiment, for example, if the DCI indicates that the A-CSI is to be determined based on a A-CSI-RS, the starting position for the time offset Y may be determined to be the end of the A-CSI-RS. In one embodiment, the starting position for the time offset Y may be determined to be the last symbol of A-CSI-RS. Suppose that the A-CSI is to be transmitted on PUSCH, in this event, the time offset Y may represent the number of symbols between the last symbol of the A-CSI-RS and the first symbol for PUSCH carrying the A-CSI. In another embodiment, the starting position for the time offset Y may be determined to be the end of the slot with A-CSI-RS. Suppose that the A-CSI is to be transmitted on PUSCH, in this event, the time offset Y may represent the number of slots between the end of the slot with A-CSI-RS and the start of slot with PUSCH carrying the A-CSI. For example, the end of the slot with A-CSI-RS may be determined based on at least one of the numerology of A-CSI-RS, the numerology of PUSCH and the numerology of PDCCH. For example, the number of slots Y may be determined based on the numerology of PUSCH. For example, the start of the slot with PUSCH may be determined based on at least one of the numerology of A-CSI-RS, the numerology of PUSCH and the numerology of PDCCH. For example, the A-CSI-RS may be triggered by the PDCCH carrying the DCI which also triggers the A-CSI report. FIG. 3C shows an example of such embodiments.

In some embodiments, as shown in FIG. 3C, A-CSI 333 may be determined based on an A-CSI-RS 331 transmitted subsequent to the transmission of DCI 332. In this event, the starting position for the time offset Y may be determined to be the last symbol of the A-CSI-RS 331. As shown in FIG. 3C, the time offset Y may represent the number of symbols between the last symbol of the A-CSI-RS 331 and the first symbol for PUSCH carrying the A-CSI 333. That is, Y=Δ2.

In above examples, the offset Y is measured in symbols. However, it is to be understood that, in some other embodiments, the offset Y can also be measured in slots. The scope of the present disclosure is not limited in this aspect.

In some embodiments, the terminal device 120 may determine respective granularities for the offsets X, Y and/or K2. The terminal device 120 may further determine the position for transmitting the CSI in time domain based on the respective granularities. A specific time offset (such as, any of the offsets X, Y and K2) can be measured in slots or symbols. As used herein, the granularity of an offset refers to the length of a slot or a symbol.

In some embodiments, a given numerology may include at least one of cyclic prefix (CP) length and subcarrier spacing (SCS). Particularly, the numerology (such as, SCS) for PDCCH carrying the DCI, and the numerology (such as, SCS) for P-CSI-RS, SP-CSI-RS or A-CSI-RS may be different. In one embodiment, the granularity of the offset X (that is, the offset between PDCCH carrying the DCI and the A-CSI-RS) may be determined based on the numerology (such as, SCS) for the A-CSI-RS. Alternatively, in one embodiment, the granularity of the offset X may be determined based on the numerology (such as, SCS) for PDCCH carrying the DCI. Alternatively, in one embodiment, the granularity of the offset X may be determined based on the maximum of the numerology (such as, SCS) for the A-CSI-RS and that for PDCCH carrying the DCI. Alternatively, in another embodiment, the granularity of the offset X may be determined based on the minimum of the numerology (such as, SCS) for the A-CSI-RS and that for PDCCH carrying the DCI.

In some embodiments, the numerology (such as, SCS) for PDCCH carrying the DCI, and the numerology (such as, SCS) for PUSCH carrying the A-CSI may be different. In some embodiments, the granularity of the offset K2 (that is, the offset between PDCCH carrying the DCI and PUSCH) may be determined based on the numerology for PUSCH.

In NR, Supplementary Uplink (SUL) can be supported in addition to the normal uplink. The numerology (such as, SCS) of PUSCH/PUCCH on UL and SUL may be different. In some embodiments, individual sets of offset values may be configured for UL and SUL. An offset in each of the sets of offset values may be at least one of the following: the number of symbols or slots between the end of PDCCH carrying the DCI with uplink scheduling information and the start of PUSCH carrying uplink data, the number of symbols or slots between the end of PDCCH carrying the DCI which triggers A-CSI and the start of PUSCH/PUCCH carrying the A-CSI, the number of symbols or slots between the end of PDCCH carrying the DCI which triggers A-CSI-RS and the start of A-CSI-RS transmission, and the number of symbols or slots between the end of A-CSI-RS transmission and the start of PUSCH/PUCCH carrying A-CSI. In one embodiment, a first set of offset values A may be configured for UL, and a second set of offset values B may be configured for SUL. In one embodiment, at least one of the values in the first set A may be different from any of the values in the second set B; or at least one of the values in the second set B may be different from any of the values in the first set A. In another embodiment, the number of values in the first set A may be different from the number of values in the second set B. For example, the number of values in the set of offset values for PUSCH/PUCCH on UL or SUL with a smaller SCS may be less than the number of values in the set of offset values for PUSCH/PUCCH on UL or SUL with a larger SCS. Suppose that the SCS for PUSCH/PUCCH on UL is configured to be $S_1$, and the SCS for PUSCH/PUCCH on SUL is configured to be $S_2$. For example, if $S_1 > S_2$, the number of values in the first set A may be less than the number of values in the second set B. As another example, if $S_1 > S_2$, the number of values in the first set A may be greater than the number of values in the second set B. As another example, if $S_1 < S_2$, the number of values in the first set A may be less than the number of values in the second set B. As another example, if $S_1 < S_2$, the number of values in the first set A may be greater than the number of values in the second set B.

In some embodiments, the configured offset values may be based on the numerology (such as, SCS) for UL, and respective offset values for SUL can be derived from those configured offset values for UL. In some embodiments, the configured offset values may be based on the numerology (such as, SCS) for SUL, and respective offset values for UL can be derived from those configured offset values for SUL. For example, the SCS for PUSCH/PUCCH on UL may be configured to be $S_1$, and the SCS for PUSCH/PUCCH on SUL may be configured to be $S_2$. In some embodiments, a set of offset values A (for example, $\{A_1, A_2, A_3 \ldots A_L\}$, where L is an integer and L>=1) may be configured for UL. Then, the set of offset values for SUL may be determined as: $\{\text{ceil } (A_i \times S_2/S_1) \text{ or floor } (A_i \times S_2/S_1) | i \in [1,L]\}$. As another example, the SCS for PUSCH/PUCCH on UL may be configured to be $S_1$, and the SCS for PUSCH/PUCCH on SUL may be configured to be $S_2$. In some embodiments, a set of offset values A (for example, $\{A_1, A_2, A_3 \ldots A_L\}$, where L is an integer and L>=1) may be configured for SUL. Then, the set of offset values for UL may be determined as $\{\text{ceil } (A_i \times S_2/S_1) \text{ or floor } (A_i \times S_2/S_1) | i \in [1,L]\}$.

In some embodiments, the configured offset values may be based on the larger numerology (such as, SCS) for UL or SUL, and respective offset values for UL or SUL with the smaller numerology (such as, SCS) can be derived from those configured offset values for UL or SUL with the larger numerology (such as, SCS). Suppose that the SCS for PUSCH/PUCCH on UL is configured to be $S_1$, and the SCS for PUSCH/PUCCH on SUL is configured to be $S_2$. For example, if $S_1 > S_2$, a set of offset values A (for example, $\{A_1, A_2, A_3 \ldots A_L\}$, where L is an integer and L>=1) may be configured based on the SCS $S_1$. Then, the set of offset values for SUL or UL based on the SCS $S_2$ may be determined as $\{\text{ceil } (A_i \times S_2/S_1) \text{ or floor } (A_i \times S_2/S_1) | i \in [1,L]\}$. As another example, if $S_1 < S_2$, a set of offset values A (for example, $\{A_1, A_2, A_3 \ldots A_L\}$, where L is integer and L>=1) may be configured based on the SCS $S_2$. Then, the set of offset values for SUL or UL based on SCS $S_1$ may be determined as $\{\text{ceil } (A_i \times S_1/S_2) \text{ or floor } (A_i \times S_2/S_1) | i \in [1,L]\}$.

In some embodiments, the configured offset values may be based on the smaller numerology (such as, SCS) for UL or SUL, and respective offset values for UL or SUL with the larger numerology (such as, SCS) can be derived from those configured offset values for UL or SUL with the smaller numerology (such as, SCS). Suppose that the SCS for PUSCH/PUCCH on UL is configured to be $S_1$, and the SCS for PUSCH/PUCCH on SUL is configured to be $S_2$. For example, if $S_1 < S_2$, a set of offset values A (for example, $\{A_1, A_2, A_3 \ldots A_L\}$, where L is an integer and L>=1) may be configured based on the SCS $S_1$. Then, the set of offset values for SUL or UL based on the SCS $S_2$ may be determined as $\{\text{ceil } (A_i \times S_2/S_1) \text{ or floor } (A_i \times S_2/S_1) | i \in [1,L]\}$. As another example, if $S_1 > S_2$, a set of offset values A (for example, $\{A_1, A_2, A_3 \ldots A_L\}$, where L is an integer and L>=1) may be configured based on the SCS $S_2$. Then, the set of offset values for SUL or UL based on SCS $S_1$ may be determined as $\{\text{ceil } (A_i \times S_1/S_2) \text{ or floor } (A_i \times S_2/S_1) | i \in [1,L]\}$.

For example, suppose that the SCS for UL is 30 kHz, and the SCS for SUL is 15 kHz. An offset value for UL has been configured to the terminal device 120, for example, which may be represented as α1. For example, α1 can be any of $\{0, 1, 2, 3\}$. In some embodiments, a corresponding offset value for SUL may be determined as ceil (α1×15 kHz/30 kHz) or floor (α1×15 kHz/30 kHz). Specifically, in some embodiments, some offset value, for example which is less than β, may be unavailable for SUL. For example, 0 will be unavailable for CSI feedback on SUL.

As described above, in some embodiments, the DCI may indicate at least one of the offsets X, Y and K2. In some embodiments, there may be some dependency among those offsets. In some embodiments, the terminal device 120 may determine the configuration for transmitting the CSI based on the dependency among those different offsets.

In some embodiment, A-CSI is to be transmitted on PUSCH (that is, A-CSI transmission is multiplexed with uplink data transmission) and the A-CSI is to be determined based on A-CSI-RS. All of the offsets X, Y and K2 may be indicated by the DCI, and the offset Y may be the offset between the A-CSI-RS and PUSCH carrying the A-CSI (such as, the example as shown in FIG. 3C). In one embodiment, if X+Y≤K2, the position for transmitting the A-CSI on PUSCH may be determined based on the offset K2. Alternatively, in another embodiment, if X+Y>K2, there may be no A-CSI feedback. Alternatively, in yet another embodiment, if X+Y>K2, there may be no data transmission on PUSCH, and the position for transmitting the A-CSI on PUSCH may be determined based on the offset (X+Y). Alternatively, in yet another embodiment, if X+Y>K2, the position for transmitting data on PUSCH may be determined based on the offset K2, and the position for transmitting the A-CSI on PUSCH may be determined based on the offset (X+Y).

In some embodiments, respective granularities for the offsets X, Y and/or K2 may be different. The offset X, Y or K2 may represent the absolute time duration. For example, the offset X may represent the absolute time duration with X symbols or slots based on a given SCS. As another example, the offset Y may represent the absolute time duration with Y symbols or slots based on a given SCS. As yet another example, the offset K2 may represent the absolute time duration with K2 symbols or slots based on a given SCS.

In some embodiment, A-CSI is to be transmitted on PUSCH (that is, A-CSI transmission is multiplexed with uplink data transmission) and the A-CSI is to be determined based on A-CSI-RS. All of the offsets X, Y and K2 may be indicated by the DCI, and the offset Y may be the offset between PDCCH carrying the DCI and PUSCH carrying the A-CSI (such as, the example as shown in FIGS. 3A and 3B). In one embodiment, if Y≤K2, the position for transmitting the A-CSI on PUSCH may be determined based on the offset K2. Alternatively, in another embodiment, if Y>K2, there may be no A-CSI feedback. Alternatively, in yet another embodiment, if Y>K2, there may be no data transmission on PUSCH, and the position for transmitting the A-CSI on PUSCH may be determined based on the offset Y. Alternatively, in yet another embodiment, if Y>K2, the position for transmitting data on PUSCH may be determined based on the offset K2, and the position for transmitting the A-CSI on PUSCH may be determined based on the offset Y.

In some embodiment, A-CSI is to be transmitted on PUSCH (that is, A-CSI transmission is multiplexed with uplink data transmission) and the A-CSI is to be determined based on A-CSI-RS. The DCI may only indicate the offsets Y and K2, but not the offset X. In one embodiment, if the offset Y is the offset between the A-CSI-RS and PUSCH carrying the A-CSI (such as, the example as shown in FIG. 3C), the offset X can be derived from the offsets Y and K2. For example, in this case, X=K2−Y. As another example, the offset X (that is, the offset between DCI and A-CSI-RS) may be based on SCS value $S_1$, the offset Y (that is, the offset between A-CSI-RS and A-CSI) may be based on SCS value $S_2$, and the offset K2 (that is, the offset between DCI and PUSCH) may be based on SCS value $S_2$. In this case, X=ceil $((K2-Y) \times S_1/S_2)$ or X=floor $((K2-Y) \times S_1/S_2)$. That is, there may be no need to explicitly indicate the offset X in DCI.

In some embodiments, as described above, the terminal device 120 may determine a channel for transmitting the A-CSI to the network device 110. For example, the channel for transmitting the A-CSI may be PUSCH or PUCCH. If the A-CSI is to be transmitted on PUSCH (that is, multiplexed with uplink data transmission), a rate matching will be performed on PUSCH. If the code rate after the rate-matching exceeds a predetermined threshold, the A-CSI will be dropped. That is, if the code rate after the rate-matching exceeds the predetermined threshold, the A-CSI will not be transmitted on PUSCH.

In some embodiments, a plurality of CSI reports can be multiplexed with PUSCH. In some embodiments, the plurality of CSI reports may include, but not limited to, Rank Indicator (RI), Channel Quality Indicator (CQI), Precoding Matrix Indicator (PMI), Strongest Layer Indicator (SLI) and so on. In some embodiments, the plurality of CSI reports may be determined based on P-CSI-RS, SP-CSI-RS or A-CSI-RS. In some embodiment, if the plurality of CSI reports are multiplexed with PUSCH, a rate matching will be performed on PUSCH. If the code rate after the rate-matching exceeds a predetermined threshold, some of the plurality of CSI reports will be dropped, until the code rate falls back below the predetermined threshold. Specifically, in some embodiments, different CSI reports may have different priorities, and the CSI reports can be dropped in a predefined order. For example, a CSI report with a lower priority will be dropped earlier than another CSI report with a higher priority.

In some embodiments, different CSI reports may be associated with different offset values (such as, the offset X, Y or K2). The offset of PUSCH containing the different CSI reports may be determined based on the maximum of the different offset values.

In some embodiments, if some of the CSI reports are dropped, the final offset value for A-CSI may be determined based on the offset values for those undropped CSI reports. For example, some of the CSI reports may be dropped due to the rate-matching. The final offset for A-CSI may be determined based on the new maximum value among those offset values of undropped CSI reports.

Alternatively, in some other embodiments, if some of the CSI reports are dropped, the final offset value for A-CSI may not be changed. For example, if one of the CSI reports is associated with the highest offset value and it is dropped due to the rate-matching, the final offset for A-CSI will still be determined as the highest offset value of the dropped CSI report.

In some embodiments, A-CSI may be transmitted on PUCCH or PUSCH. Whether the A-CSI is transmitted on PUCCH or PUSCH may be determined based on a DCI format. In one embodiment, if A-CSI is triggered by a downlink related DCI format, A-CSI may be transmitted on PUCCH. For example, the DCI may be used for downlink assignment (for example, DCI format 1_0 or 1_1). As another example, if A-CSI is triggered by an uplink related DCI format, A-CSI may be transmitted on PUSCH. For example, the DCI may be used for uplink assignment (for example, DCI format 0_0 or 0_1). In some embodiments, there may be PUCCH and PUSCH triggered for A-CSI in a same slot. In one embodiment, the PUCCH and PUSCH may be multiplexed based on Time Division Multiplexing (TDM) technology or Frequency Division Multiplexing (FDM) technology. In another embodiment, the PUCCH may be dropped. In yet another embodiment, the A-CSI or Acknowledgement (ACK)/Negative Acknowledgement (NACK) on PUCCH may be also transmitted on PUSCH in the same slot.

In some embodiments, there may be a bit field for an offset value in DCI. For different transmission of A-CSI or HARQ-ACK, the sets of offset values may be different. For example, a first set of offset values $B_1$ may be used for HARQ-ACK only transmission. A second set of offset values $B_2$ may be used for A-CSI only transmission. A third set of offset values $B_3$ may be used for both HARQ-ACK and A-CSI transmission. In one embodiment, if both HARQ-ACK and A-CSI are triggered by the same DCI, the offset for HARQ-ACK and A-CSI transmission may be the larger one between an offset for HARQ transmission and an offset for A-CSI transmission. In another embodiment, if both HARQ-ACK and A-CSI are triggered by the same DCI, the offsets for HARQ-ACK and A-CSI transmission may be independent of each other. For example, the HARQ-ACK transmission may be based on the offset values indicated in the first set $B_1$ and the A-CSI transmission may be based on the offset values indicated in the second set $B_2$.

Returning to FIG. 2, prior to or subsequent to the act 210, the network device 110 may transmit a CSI-RS to the terminal device 120 for determining the CSI of the downlink channel (not shown in FIG. 2). For example, the CSI-RS may be a P-CSI-RS, SP-CSI-RS or A-CSI-RS. The DCI transmitted to the terminal device 120 indicates that the CSI is to be determined based on the CSI-RS. In response to receiving the CSI-RS from the network device 110, the terminal device 120 may determine (240) the CSI by measuring the CSI-RS. Then, the terminal device 120 may transmit the CSI to the network device 110 based on the configuration determined at the act 220. Likewise, the network device 110 may receive the CSI from the terminal device based on the configuration determined at the act 230.

Figure 4:
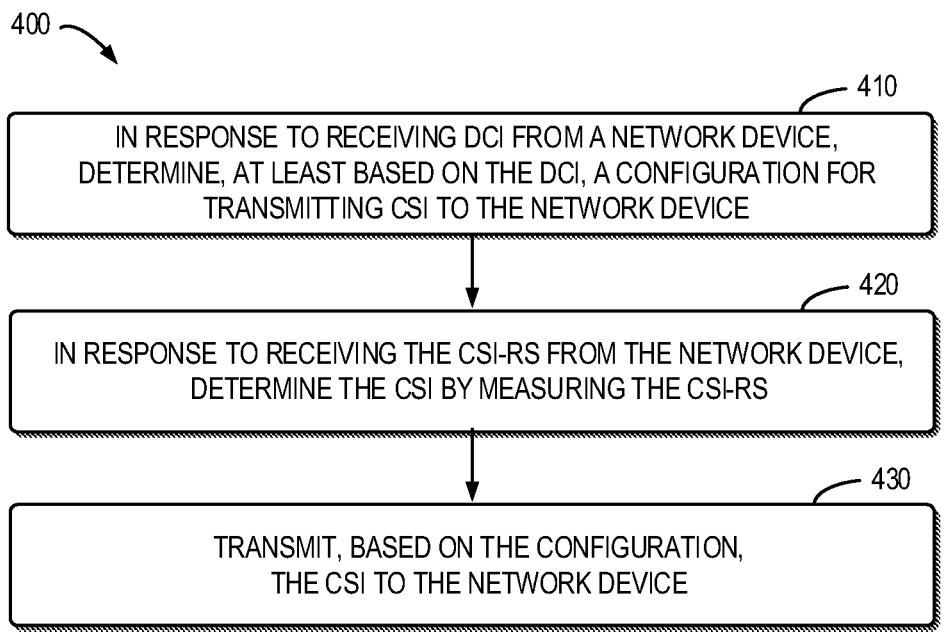
FIG. 4 shows a flowchart of an example method 400 for CSI transmission according to some embodiments of the present disclosure.

FIG. 4 shows a flowchart of an example method 400 in accordance with some embodiments of the present disclosure. The method 400 can be implemented at the terminal device 120 as shown in FIG. 1. For the purpose of discussion, the method 400 will be described from the perspective of the terminal device 120 with reference to FIG. 1.

At block 410, in response to receiving Downlink Control Information (DCI) from the network device 110, the terminal device 120 determines, at least based on the DCI, a configuration for transmitting Channel State Information (CSI) to the network device 110. The DCI indicates a Channel State Information-Reference Signal (CSI-RS) for determining the CSI and timing information associated with the CSI.

In some embodiments, the timing information includes at least one of the following: a first time offset for transmitting an aperiodic CSI-RS by the network device; a second time offset for transmitting the CSI by the terminal device; and a third time offset for Physical Uplink Shared Channel (PUSCH) transmission.

In some embodiments, the terminal device 120 determines, based on at least one of the first, second and third time offsets, a position for transmitting the CSI in time domain.

In some embodiments, the timing information includes the second time offset. The terminal device 120 may determine a starting position for the second time offset in time domain. The terminal device 120 may further determine the position for transmitting the CSI in time domain based on the starting position and the second time offset.

In some embodiments, in response to the DCI indicating that the CSI is to be determined based on a periodic or semi-persistent CSI-RS, the terminal device 120 determines the starting position for the second time offset as the last symbol of Physical Downlink Control Channel (PDCCH) carrying the DCI.

In some embodiments, in response to the DCI indicating that the CSI is to be determined based on the aperiodic CSI-RS, the terminal device 120 determines the starting position for the second time offset as the last symbol of the aperiodic CSI-RS.

In some embodiments, the timing information includes the first, second and third time offsets. The terminal device 120 determines, based on a relationship among the first, second and third time offsets, the position for transmitting the CSI in time domain.

In some embodiments, the terminal device 120 determines at least one granularity for the at least one of the first, second and third time offsets. The terminal device 120 further determines, based on the at least one granularity, the position for transmitting the CSI in time domain.

In some embodiments, the terminal device 120 determines a channel for transmitting the CSI to the network device.

At block 420, in response to receiving the CSI-RS from the network device, the terminal device 120 determines the CSI by measuring the CSI-RS.

At block 430, the terminal device 120 transmits the CSI to the network device 110 based on the configuration.

In some embodiments, the configuration indicates that the CSI is to be transmitted on PUSCH. In response to a code rate for PUSCH transmission being below a predetermined threshold, the terminal device 120 transmits the CSI to the network device 110 on the PUSCH.

In some embodiments, the CSI may be aperiodic, and the CSI-RS for determining the CSI may be periodic, semi-persistent or aperiodic.

Figure 5:
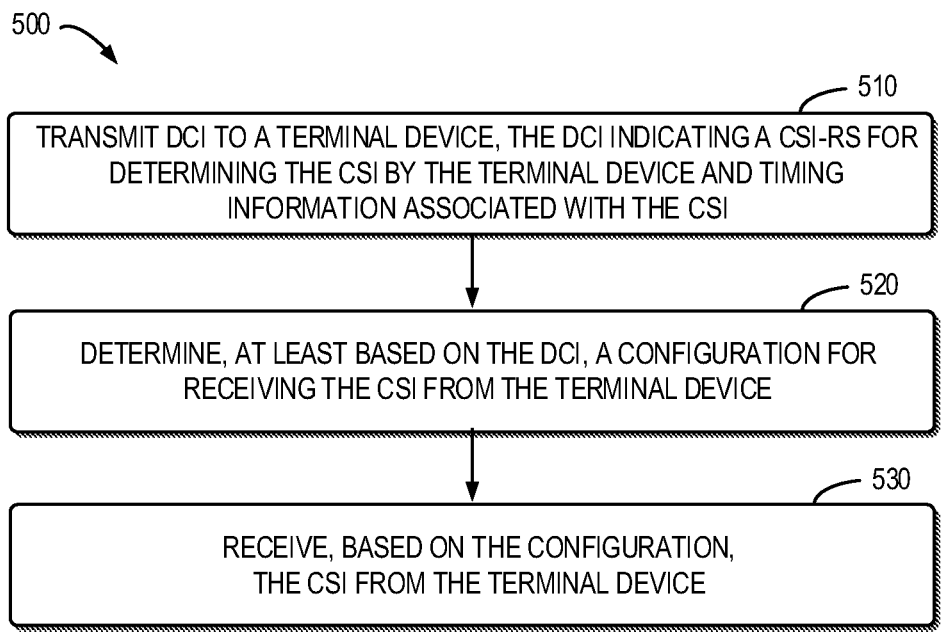
FIG. 5 shows a flowchart of an example method 500 for CSI transmission according to some embodiments of the present disclosure.

FIG. 5 shows a flowchart of an example method 500 in accordance with some embodiments of the present disclosure. The method 500 can be implemented at the network device 110 as shown in FIG. 1. For the purpose of discussion, the method 500 will be described from the perspective of the network device 110 with reference to FIG. 1.

At block 510, the network device 110 transmits Downlink Control Information (DCI) to the terminal device 120. The DCI indicates a Channel State Information-Reference Signal (CSI-RS) for determining the Channel State Information (CSI) by the terminal device 120 and timing information associated with the CSI.

In some embodiments, the timing information includes at least one of the following: a first time offset for transmitting an aperiodic CSI-RS by the network device; a second time offset for transmitting the CSI by the terminal device; and a third time offset for Physical Uplink Shared Channel (PUSCH) transmission.

At block 520, the network device 110 determines, at least based on the DCI, a configuration for receiving the CSI from the terminal device 120.

In some embodiments, the network device 110 determines a position for receiving the CSI in time domain based on at least one of the first, second and third time offsets.

In some embodiments, the timing information includes the second time offset. The network device 110 determines a starting position for the second time offset in time domain. The network device 110 determines, based on the starting position and the second time offset, the position for receiving the CSI in time domain.

In some embodiments, in response to the DCI indicating that the CSI is to be determined based on a periodic or semi-persistent CSI-RS, the network device 110 determines the starting position for the second time offset as the last symbol of Physical Downlink Control Channel (PDCCH) carrying the DCI.

In some embodiments, in response to the DCI indicating that the CSI is to be determined based on the aperiodic CSI-RS, the network device 110 determines the starting position for the second time offset as the last symbol of the aperiodic CSI-RS.

In some embodiments, the timing information includes the first, second and third time offsets. The network device 110 determines, based on a relationship among the first, second and third time offsets, the position for receiving the CSI in time domain.

In some embodiments, the network device 110 determines at least one granularity for the at least one of the first, second and third time offsets. The network device 110 further determines, based on the at least one granularity, the position for receiving the CSI in time domain.

In some embodiments, the CSI may be aperiodic, and the CSI-RS for determining the CSI may be periodic, semi-persistent or aperiodic.

At block 530, the network device 110 receives, based on the configuration, the CSI from the terminal device 120.

Figure 6:
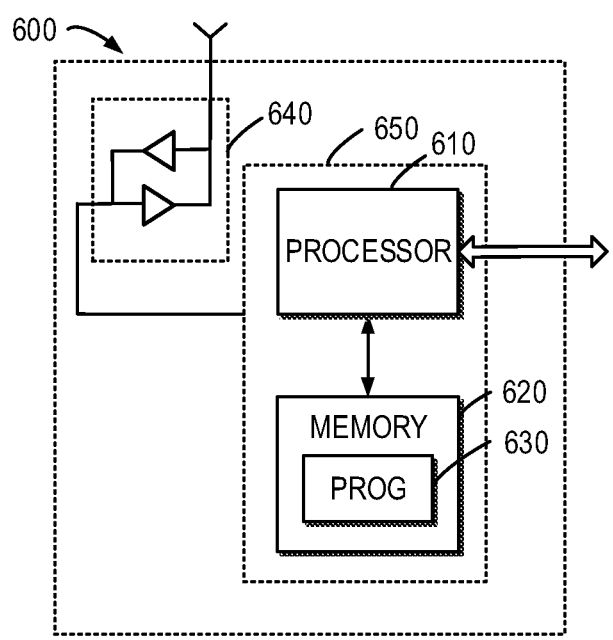
FIG. 6 is a simplified block diagram of a device that is suitable for implementing embodiments of the present disclosure.

FIG. 6 is a simplified block diagram of a device 600 that is suitable for implementing embodiments of the present disclosure. The device 600 can be considered as a further example implementation of the network device 110 as shown in FIG. 1. Accordingly, the device 600 can be implemented at or as at least a part of the network device 110.

As shown, the device 600 includes a processor 610, a memory 620 coupled to the processor 610, a suitable transmitter (TX) and receiver (RX) 640 coupled to the processor 610, and a communication interface coupled to the TX/RX 640. The memory 610 stores at least a part of a program 630. The TX/RX 640 is for bidirectional communications. The TX/RX 640 has at least one antenna to facilitate communication, though in practice an Access Node mentioned in this application may have several ones. The communication interface may represent any interface that is necessary for communication with other network elements, such as X2 interface for bidirectional communications between eNBs, $S_1$ interface for communication between a Mobility Management Entity (MME)/Serving Gateway (S-GW) and the eNB, Un interface for communication between the eNB and a relay node (RN), or Uu interface for communication between the eNB and a terminal device.

The program 630 is assumed to include program instructions that, when executed by the associated processor 610, enable the device 600 to operate in accordance with the embodiments of the present disclosure, as discussed herein with reference to FIGS. 1 to 8. The embodiments herein may be implemented by computer software executable by the processor 610 of the device 600, or by hardware, or by a combination of software and hardware. The processor 610 may be configured to implement various embodiments of the present disclosure. Furthermore, a combination of the processor 610 and memory 610 may form processing means 650 adapted to implement various embodiments of the present disclosure.

The memory 610 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 610 is shown in the device 600, there may be several physically distinct memory modules in the device 600. The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 1 to 7B. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, comprising:
receiving a Downlink control information (DCI) comprising a configuration of Channel state information (CSI), and
determining whether or not to provide the CSI based on a first condition of a first time offset and a second time offset, wherein a start position for the first time offset is determined based on the DCI, and a start position for the second time offset is determined based on an aperiodic signal for the CSI, wherein the first condition comprises whether a time position to provide the CSI is no earlier than the first time offset after reception of the DCI,
wherein the first time offset is related with a time duration between the DCI and an uplink transmission.

2. The method of claim 1, wherein the second time offset is related with a time duration between the aperiodic signal for the CSI and an uplink transmission.

3. The method of claim 1, wherein the start position for the first time offset is determined based on a last symbol of a PDCCH carrying the DCI and the start position of the second time offset is determined based on a last symbol of the aperiodic signal for the CSI.

4. The method of claim 1 further comprising determining the first time offset and the second time offset based on numerology of the DCI, the aperiodic signal and a transmission of the CSI.

5. The method of claim 1, wherein the first time offset is determined based on the maximum of a plurality of first time offsets corresponding to a plurality of CSI reports if indicated by the configuration of CSI and the second time offset is determined based on the maximum of a plurality of second time offsets corresponding to the plurality of CSI reports if indicated by the configuration of CSI.

6. The method of claim 1, wherein the first condition comprises whether or not a time duration related with the first time offset is smaller than or equals to a time duration between the DCI and the time position to provide the CSI.

7. The method of claim 1 further comprising:
providing the CSI if the time position to provide the CSI is no earlier than the first time offset after reception of the DCI and the time position to provide the CSI is after the second time offset.

8. The method of claim 1 further comprising:
determining not to provide the CSI if the time position to provide the CSI is earlier than the first time offset after the reception of the DCI.

9. The method of claim 1, wherein each of the first time offset and the second time offset corresponds to a number of symbols.

10. The method of claim 1, wherein the aperiodic signal comprises an aperiodic CSI-RS.

11. A terminal device comprising a processor configured to
receive a Downlink control information (DCI) comprising a configuration of Channel state information (CSI), and
determine whether or not to provide the CSI based on a first condition of a first time offset and a second time offset, wherein a start position for the first time offset is determined based on the DCI, and a start position for the second time offset is determined based on an aperiodic signal for the CSI, wherein the first condition comprises whether a time position to provide the CSI is no earlier than the first time offset after reception of the DCI,
wherein the first time offset is related with a time duration between the DCI and an uplink transmission.

12. The terminal device of claim 11 wherein the second time offset is related with a time duration between the aperiodic signal for the CSI and an uplink transmission.

13. The terminal device of claim 11, wherein the start position for the first time offset is determined based on a last symbol of a PDCCH carrying the DCI and the start position of the second time offset is determined based on a last symbol of the aperiodic signal for the CSI.

14. The terminal device of claim 11, wherein the processor is further configured to determine the first time offset and the second time offset based on numerology of the DCI, the aperiodic signal and a transmission of the CSI.

15. The terminal device of claim 11, wherein the first time offset is determined based on the maximum of a plurality of first time offsets corresponding to a plurality of CSI reports if indicated by the configuration of CSI and the second time offset is determined based on the maximum of a plurality of second time offsets corresponding to the plurality of CSI reports if indicated by the configuration of CSI.

16. The terminal device of claim 11, wherein the first condition comprises whether or not a time duration related with the first time offset is smaller than or equals to a time duration between the DCI and the time position to provide the CSI.

17. The terminal device of claim 11, wherein the processor is further configured to
provide the CSI if the time position to provide the CSI is no earlier than the first time offset after reception of the DCI and the time position to provide the CSI is after the second time offset.

18. The terminal device of claim 11, wherein the processor is further configured to
determine not to provide the CSI if the time position to provide the CSI is earlier than the first time offset after the reception of the DCI.

19. The terminal device of claim 11, wherein each of the first time offset and the second time offset corresponds to a number of symbols.

20. The terminal device of claim 11, wherein the aperiodic signal comprises an aperiodic CSI-RS.

21. A method performed by a network device, comprising:
transmitting, to a terminal device, a downlink control information (DCI) comprising a configuration of CSI for triggering a Channel state information (CSI) report, and
receiving, from the terminal device, the CSI report, wherein the CSI report is determined based on a first condition of a first time offset and a second time offset, wherein a start position for the first time offset is determined based on the DCI and a start position for the second time offset is determined based on an aperiodic signal for the CSI, wherein the first condition comprises a time position to provide the CSI is no earlier than the first time offset after the DCI,
wherein the first time offset is related with a time duration between the DCI and an uplink transmission.

22. A network device, comprising a processor configured to
transmit, to a terminal device, a downlink control information (DCI) comprising a configuration of CSI for triggering a Channel state information (CSI) report, and
receive, from the terminal device, the CSI report, wherein the CSI report is determined based on a first condition of a first time offset and a second time offset, wherein a start position for the first time offset is determined based on the DCI and a start position for the second time offset is determined based on an aperiodic signal for the CSI, wherein the first condition comprises a time position to provide the CSI is no earlier than the first time offset after the DCI,
wherein the first time offset is related with a time duration between the DCI and an uplink transmission.

* * * * *